United States Patent
Hirose

(10) Patent No.: US 8,444,111 B2
(45) Date of Patent: May 21, 2013

(54) COMBINED VALVE

(75) Inventor: Katsunori Hirose, Kasugai (JP)

(73) Assignee: CKD Corporation, Komaki (JP)

( * ) Notice: Subject to any disclaimer, the term of this patent is extended or adjusted under 35 U.S.C. 154(b) by 380 days.

(21) Appl. No.: 12/874,692

(22) Filed: Sep. 2, 2010

(65) Prior Publication Data

US 2011/0073197 A1  Mar. 31, 2011

(30) Foreign Application Priority Data

Sep. 29, 2009  (JP) .................. 2009-224686

(51) Int. Cl.
*F16K 31/00* (2006.01)
*F16K 35/00* (2006.01)

(52) U.S. Cl.
USPC ............. 251/63.5; 251/62; 251/101; 137/385

(58) Field of Classification Search
USPC ................ 137/488, 385; 251/14, 28, 29, 331, 251/63.5, 62, 101
See application file for complete search history.

(56) References Cited

U.S. PATENT DOCUMENTS

2007/0290154 A1* 12/2007 Aoyama et al. ................. 251/63

FOREIGN PATENT DOCUMENTS

| JP | A-57-171193 | 10/1982 |
| JP | A-2005-214231 | 8/2005 |
| JP | A-2005-291380 | 10/2005 |
| JP | A-2005-325893 | 11/2005 |
| JP | A-2005-344918 | 12/2005 |
| JP | A-2008-144817 | 6/2008 |

OTHER PUBLICATIONS

Japanese Office Action dated Oct. 18, 2011 issued in Japanese Patent Application No. 2009-224686 (with translation).

* cited by examiner

*Primary Examiner* — John K Fristoe, Jr.
*Assistant Examiner* — Michael R Reid
(74) *Attorney, Agent, or Firm* — Oliff & Berridge, PLC

(57) ABSTRACT

A combined valve includes a pilot mechanism and a manual mechanism. The manual mechanism includes: a flange formed with a communication passage; a housing including a holding hole formed in an axial direction for rotatably holding the manual mechanism and a storage opening part having a wider diameter than the holding hole and housing the flange in position; an operation port located in a position corresponding to the holding hole and internally holding a joint; and an exhaust port opening in an inner wall of the storage opening. The manual mechanism further includes a first sealing member forming a connecting passage to connect the operation port and the communication passage between the housing and the manual mechanism; and a second sealing member sealingly separating an opening portion of the exhaust port opening in the inner wall of the storage opening part from the connecting passage.

8 Claims, 13 Drawing Sheets

COMBINED VALVE

CROSS-REFERENCE TO RELATED APPLICATIONS

This application is based upon and claims the benefit of priority from the prior Japanese Patent Application No. 2009-224686 filed on Sep. 29, 2009, the entire contents of which are incorporated herein by reference.

TECHNICAL FIELD

The present invention relates to a combined valve integrally including a pilot valve for opening/closing a valve by supply and exhaust of operation air and a manual valve serving as a safety device.

BACKGROUND ART

Heretofore, a system to be used in a semiconductor manufacturing process, provided with pipes for flowing various gases and others, requires a safety device for preventing gas leakage due to a malfunction of a pilot valve when the pipes are removed from the system for various operations or works. In a semiconductor manufacturing line, size reduction and cost reduction of each apparatus or device is always demanded. Accordingly, a combined valve integrally including a pilot valve and a manual valve serving as a safety device has been adopted up to now.

FIG. 13 is a sectional view of a conventional combined valve 101.

The conventional combined valve 101 includes a valve mechanism arranged to bring a diaphragm valve 103 into or out of contact with a valve seat 102. The combined valve 101 is integrally formed with a pilot valve and a manual valve, the pilot valve having a pilot mechanism for opening/closing a valve.

The pilot valve includes an operation port 104 connected to a not-shown supply/exhaust device via a joint 105. The pilot valve is configured to move pistons 110 and 111 upward and downward by a balance between a pressure of operation air supplied from the operation port 104 to piston chambers 107 and 108 via a supply/exhaust passage 106 and an elastic force of a restoring spring 109 to bring a diaphragm valve 103 into or out of contact with the valve seat 102.

A cylinder 113 of the pilot valve threadedly engages with a manual mechanism 114 of the manual valve. The manual mechanism 114 is configured by integrally coupling a handle 116, a manual stem 117, a sub handle 118, and a center rod 119 which are held in a housing 120 mounted on the cylinder 113. In the manual mechanism 114, a through hole 115 is formed in the sub handle 118 and the center rod 119, the through hole 115 being at a position corresponding to the operation port 104 and extending in a radial direction of the cylinder 113.

In the combined valve 101, when the manual mechanism 114 is rotated in a clockwise direction, the manual mechanism 114 is moved downward, bringing the diaphragm valve 103 into contact with the valve seat 102 through the piston rod 112. At this time, the through hole 115 is not communicated with the operation port 104 but is communicated with a not-shown exhaust port. Therefore, the valve is not opened even if the operation air is supplied to the operation port 104. When the manual mechanism 114 is rotated in a counter-clockwise direction, the manual mechanism 114 is moved upward to be separated from the piston rod 112, releasing a pressing force to press the diaphragm valve 103 to the valve seat 102. At this time, the operation port 104 is connected with the through hole 115 to communicate with the piston chambers 107 and 108 via the through hole 115. Thus, the pilot valve is enabled to freely conduct a valve opening/closing operation (see Patent Literature 1, for example).

CITATION LIST

Patent Literature

Patent Literature 1: JP2005-214231A

SUMMARY OF INVENTION

Technical Problem

However, in the conventional combined valve 101, the sub handle 118 is provided on an outer periphery of the center rod 119. Therefore, the housing 120 has a thinner thickness in part where the center rod 119 and the sub handle 118 are placed. Further, the combined valve 101 is configured to have the operation port 104 in the thin-thickness part and to bring the operation port 104 into communication with the through hole 115 in the sub handle 118 and the center rod 119. The joint 105 could not be built in the housing 120 accordingly. In other words, the joint 105 has to be connected to the operation port 104 in a manner that the joint 105 protrudes outside from an outer peripheral surface of the housing 120. Accordingly, the conventional combined valve 101 requires an installation space for the joint 105 when the valve 101 is assembled to a semiconductor manufacturing line or the like. The semiconductor manufacturing line, which requires size reduction as mentioned above, is demanded to omit the space for the joint 105 for size reduction.

Solution to Problem

The present invention has been made to solve the above problem and has an object to provide a small-sized combined valve.

To achieve the above object, one aspect of the present invention provides a combined valve comprising a pilot valve and a manual valve, the pilot valve including: a valve mechanism having a valve seat and a diaphragm valve to be brought into or out of contact with the valve seat; and a pilot mechanism arranged to cause the diaphragm valve placed in contact with the valve seat by an urging member to be separated from the valve seat by pneumatic pressure, the pilot mechanism including an exhaust port and an operation port, the manual valve including a manual mechanism provided in a side of the pilot valve opposite from the valve mechanism, the manual mechanism including a communication passage and being rotatable to switch between a first position and a second position, the first position being set to close the pilot valve by making the exhaust port of the pilot mechanism communicate with the communication passage of the manual mechanism and the second position being set to allow a free opening/closing operation of the pilot valve by making the operation port of the pilot mechanism communicate with the communication passage. In the combined valve, the pilot mechanism has a housing provided with the exhaust port and the operation port, the manual mechanism has a flange formed with the communication passage, the housing includes: a holding hole formed in an axial direction for rotatably holding the manual mechanism; and a storage opening part having a wider diameter than the holding hole and housing the flange in position, the operation port is located in a position corresponding to the holding hole and internally holds a joint, and the exhaust port opens in an inner wall of the storage opening part, the combined valve further includes: a first sealing member forming a connecting passage to connect the operation port and the communication passage between the housing and the manual mechanism; and a second sealing member sealingly separating an opening portion of the exhaust port opening in the inner wall of the storage opening part from the connecting passage.

Advantageous Effects of Invention

In the above combined valve, the flange of the manual mechanism is formed with the communication passage, achieving the manual mechanism with a reduced width. The housing in the pilot mechanism has the storage opening part for housing the flange. The storage opening part has a larger diameter than the holding hole for holding the manual mechanism. Further, the exhaust port opens in an inner wall of the storage opening part. Thereby, the housing has a thick thickness in the radial direction in a portion corresponding to the holding hole which is provided closer to the manual mechanism than the storage opening part. Thus, the operation port is formed in the thick portion of the housing corresponding to the holding hole internally hold the joint so that the joint does not protrude outside the housing. The first sealing members form the connecting passage between the housing and the manual mechanism to provide communication between the operation port and the communication passage. The second sealing member is provided to sealingly separate the opening portion of the exhaust port opening in the inner wall of the storage opening part from the connecting passage. As a result, when the manual mechanism is switched to the first position, the communication passage is communicated with the exhaust port while the passage is sealingly separated from the connecting passage by the second sealing member so as not to communicate with the connecting passage. Thereby, the pilot valve is unable to adjust pneumatic pressure of the pilot mechanism and the valve is closed. On the other hand, when the manual mechanism is switched to the second position, the communication passage is communicated with the operation port through the connecting passage while the passage is sealingly separated from the connecting passage by the second sealing member so as not to communicate with the exhaust port through the connecting passage. Consequently, the pilot valve is able to adjust the pneumatic pressure of the pilot mechanism and the valve opening/closing operation of the valve mechanism can be freely conducted. Therefore, the above-mentioned combined valve can internally mount the joint in the housing without protrusion and hence achieve size reduction.

DESCRIPTION OF EMBODIMENTS

A detailed description of a preferred embodiment of a combined valve embodying the present invention will now be given referring to the accompanying drawings.

First Embodiment

Figure 1:
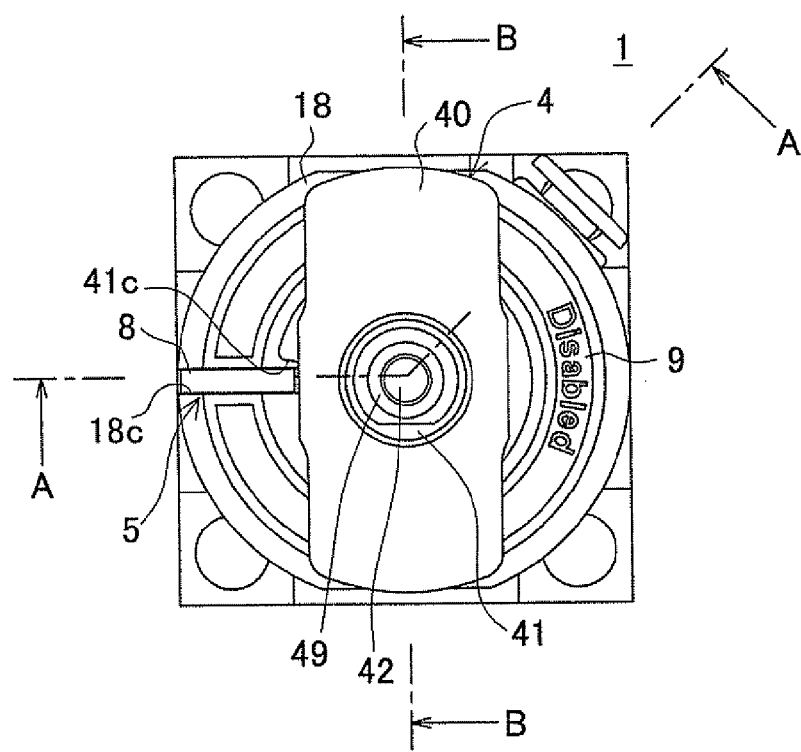
FIG. 1 is a top view of a combined valve in a first embodiment of the invention in which a manual mechanism is positioned in a first position.
Figure 2:
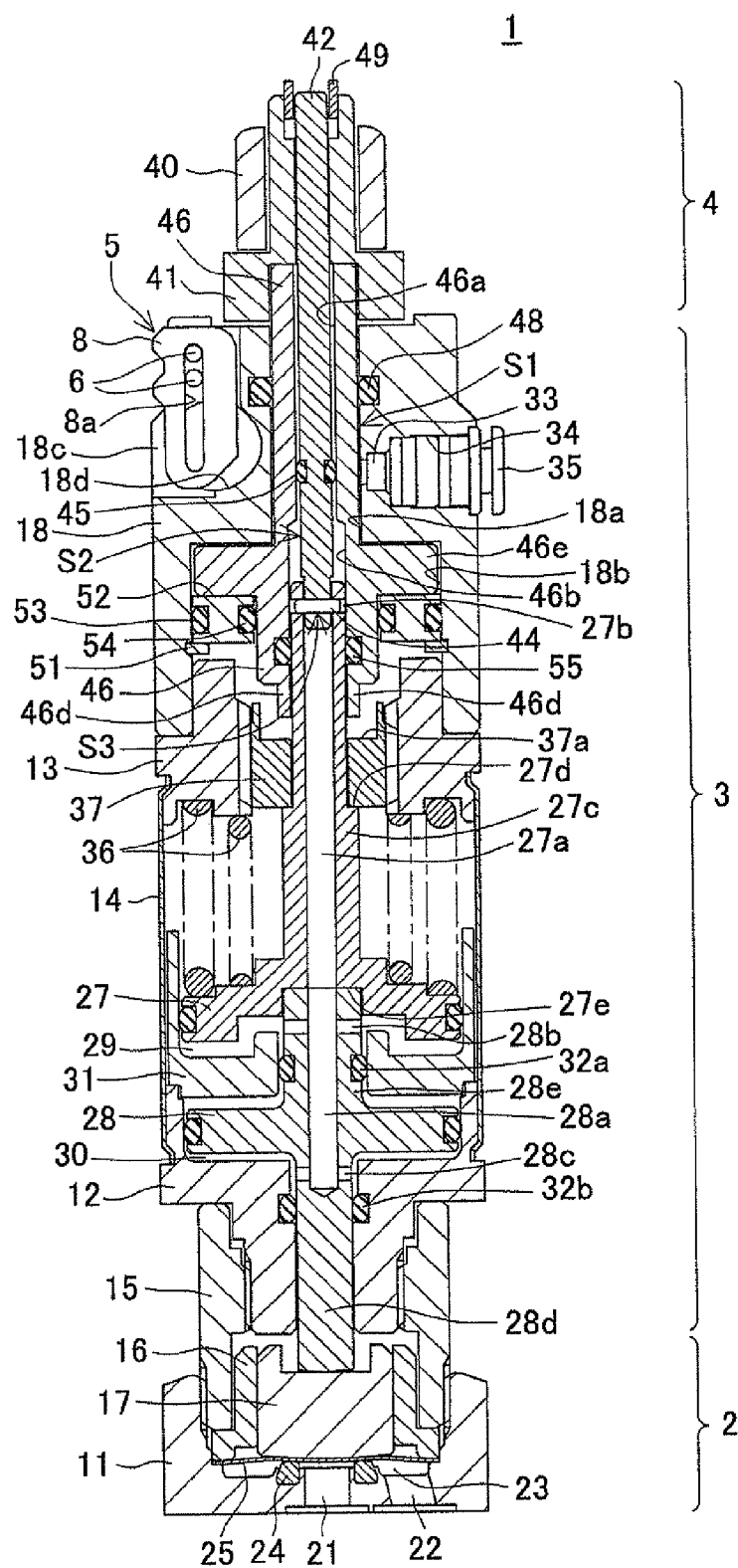
FIG. 2 is a sectional view of the combined valve taken along a line A-A in FIG. 1.
Figure 3:
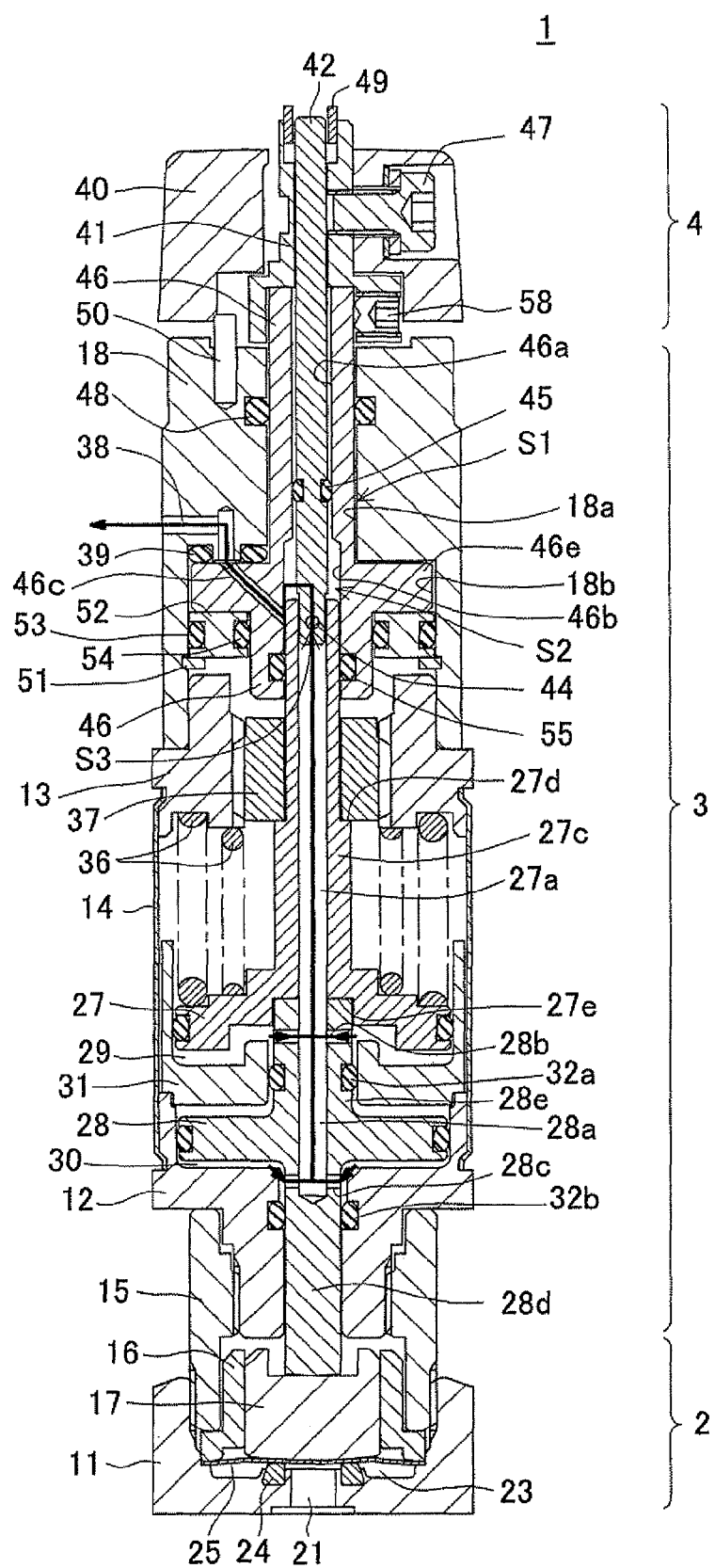
FIG. 3 is a sectional view of the combined valve taken along a line B-B in FIG. 2.
Figure 4:
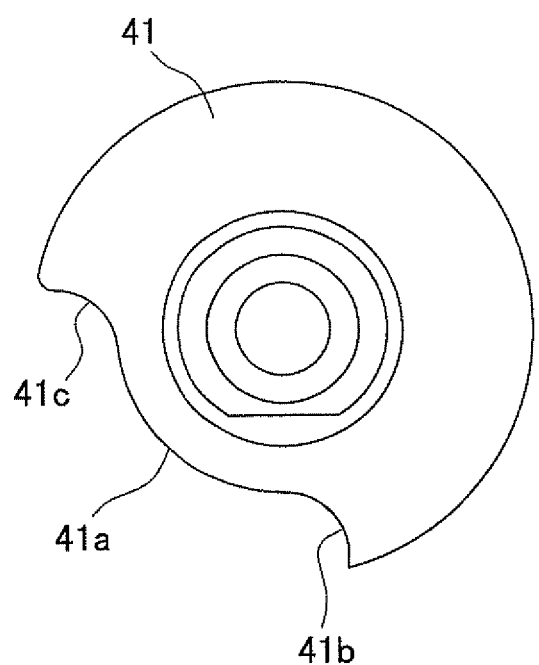
FIG. 4 is a top view of a sub handle.
Figure 5:
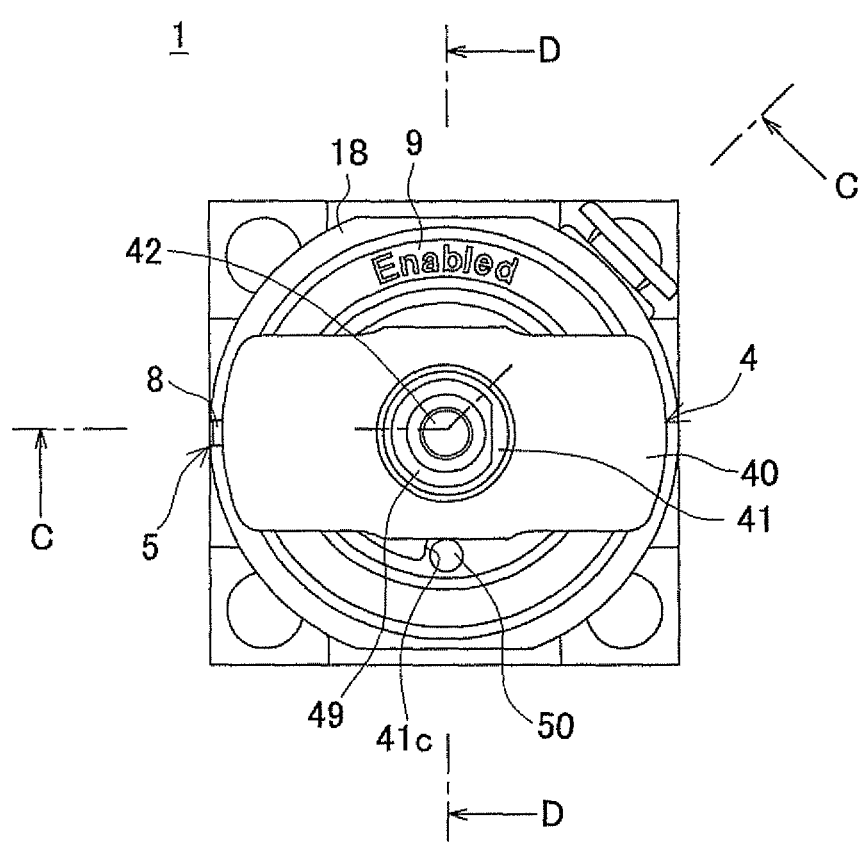
FIG. 5 is a top view of the combined valve in which a manual valve is positioned in a second position.
Figure 6:
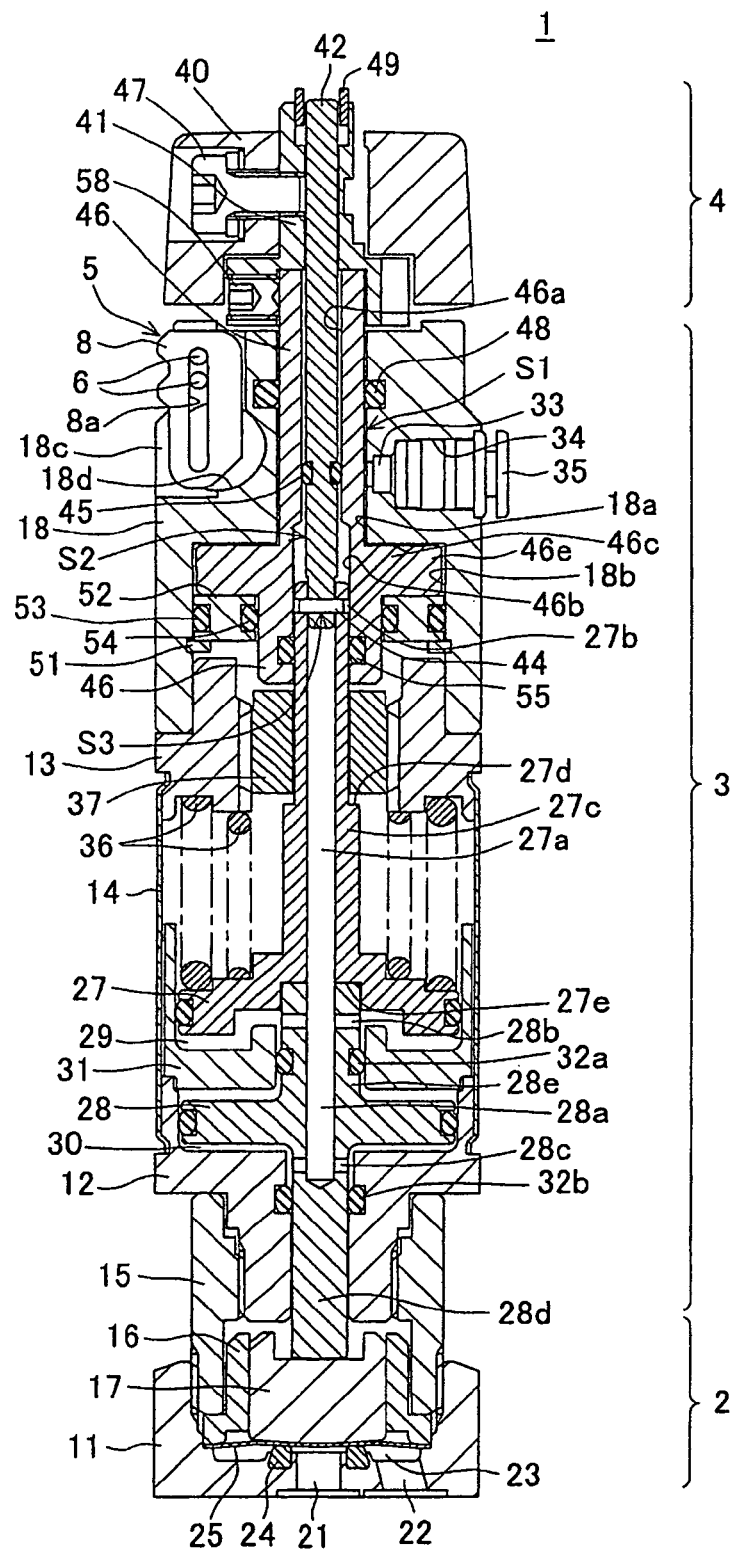
FIG. 6 is a sectional view of the combined valve taken along a line C-C in FIG. 5 in which a pilot mechanism is in a valve-closing state while the manual mechanism is positioned in the second position.
Figure 7:
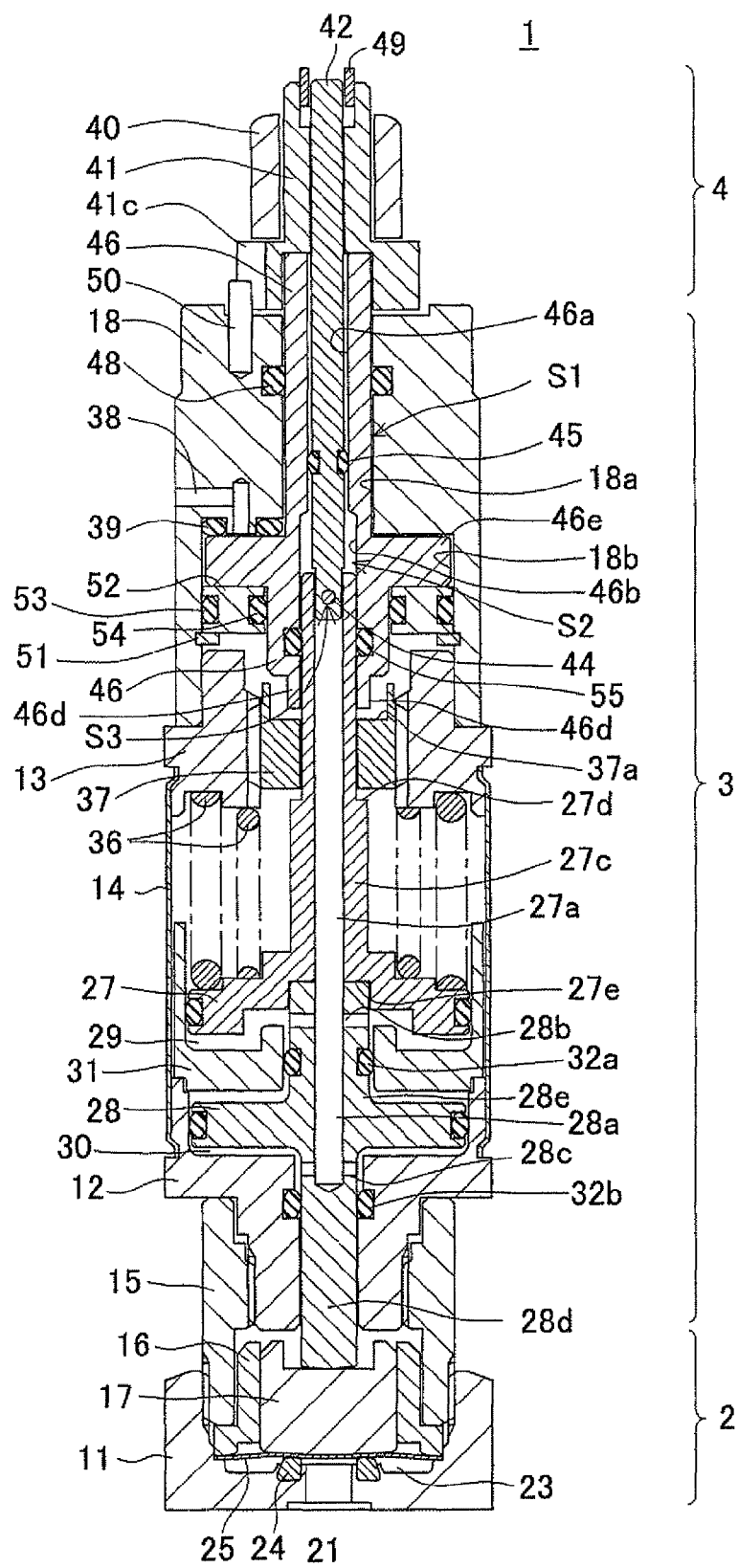
FIG. 7 is a sectional view of the combined valve taken along a line D-D in FIG. 5 in which the pilot mechanism is in the valve-closing state while the manual mechanism is positioned in the second position.
Figure 8:
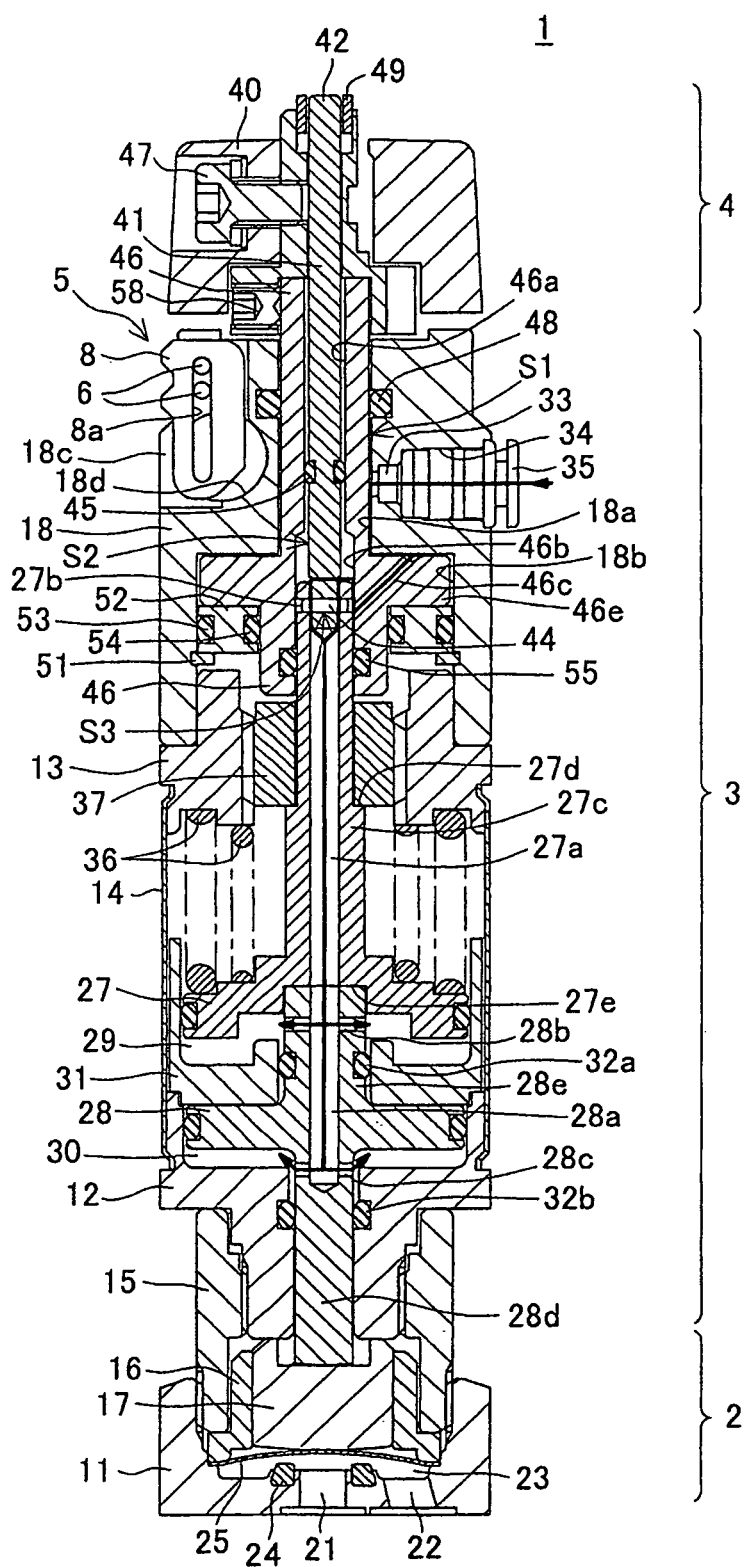
FIG. 8 is a sectional view of the combined valve taken along a line C-C in FIG. 5 in which the pilot mechanism is in a valve-opening state while the manual valve is positioned in the second position.
Figure 9:
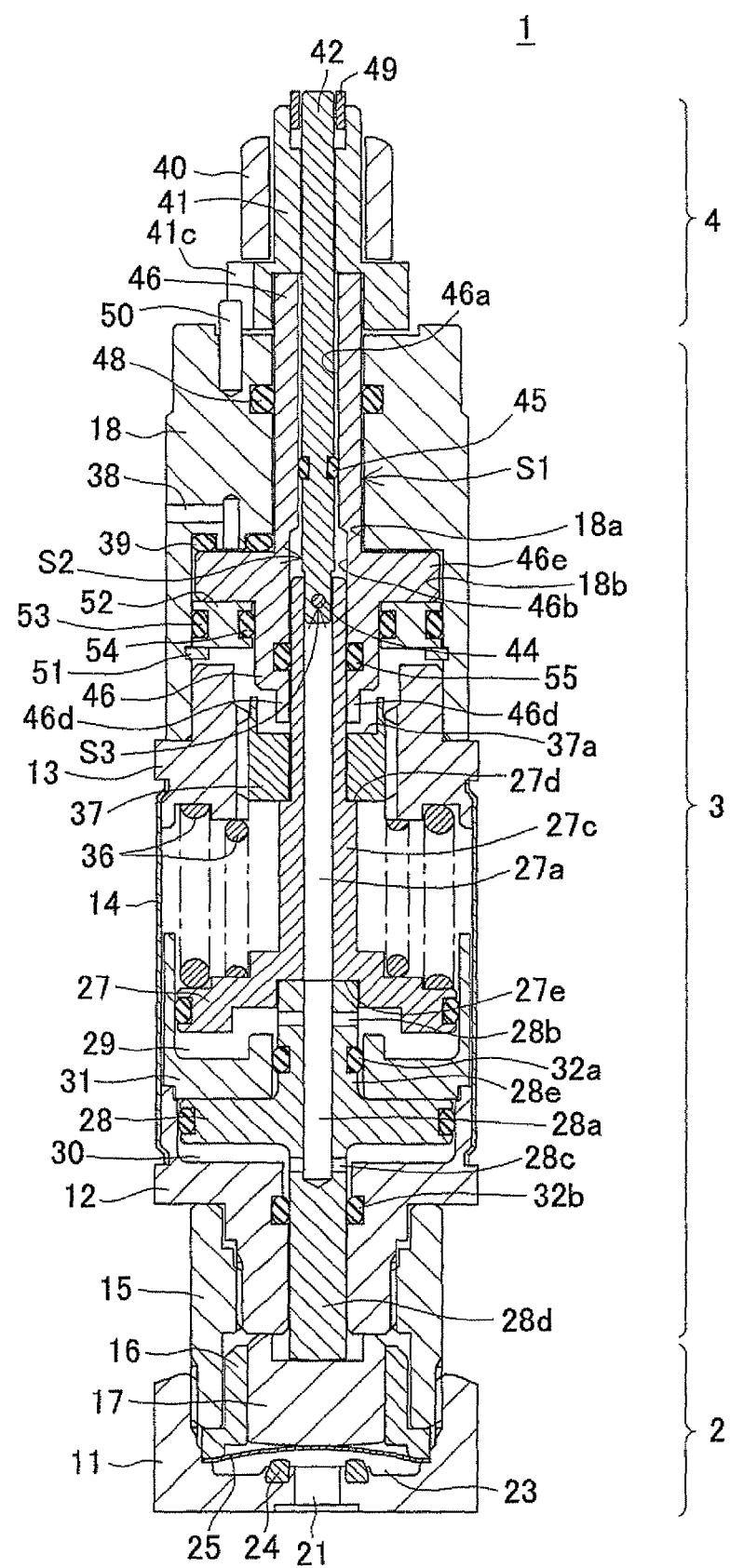
FIG. 9 is a sectional view of the combined valve taken along a line D-D in FIG. 5 in which the pilot mechanism is in the valve-opening state while the manual valve is positioned in the second position.

FIG. 1 is a top view of a combined valve 1 in a first embodiment of the invention in which a manual mechanism 4 is positioned in a first position. FIG. 2 is a sectional view of the combined valve 1 taken along a line A-A in FIG. 1. FIG. 3 is a sectional view of the combined valve 1 taken along a line B-B in FIG. 1. FIG. 4 is a top view of a sub handle 41. FIG. 5 is a top view of the combined valve 1 in which the manual mechanism 4 is positioned in a second position. FIG. 6 is a sectional view of the combined valve 1 taken along a C-C line in FIG. 5 in which a pilot mechanism 3 is in a valve-closing state while the manual mechanism 4 is positioned in the second position. FIG. 7 is a sectional view of the combined valve 1 taken along a line D-D in FIG. 5 in which the pilot mechanism 3 is in the valve-closing state while the manual mechanism 4 is positioned in the second position. FIG. 8 is a sectional view of the combined valve 1 taken along a line C-C in FIG. 5 in which the pilot mechanism 3 is in the valve-opening state while the manual mechanism 4 is positioned in the second position. FIG. 9 is a sectional view of the combined valve 1 taken along a line D-D in FIG. 5 in which the pilot mechanism 3 is in the valve-opening state while the manual mechanism 4 is positioned in the second position.

<Overall Configuration of Combined Valve>

As shown in FIGS. 2 and 3, the combined valve 1 integrally includes a pilot valve configured to operate a valve mechanism 2 by the pilot mechanism 3 and a manual valve serving as a safety valve to operate the valve mechanism 2 by the manual mechanism 4. As shown in FIG. 2, the combined valve 1 is provided with a lock mechanism 5 to lock the manual mechanism 4 by use of a not-shown key during the valve-closing state to prevent erroneous supply of a fluid. An outer configuration of the combined valve 1 is formed with a valve body 11, an adapter 15, a base 12, a tube 14, a cap 13, and a housing 18 in which a joint 35 is mounted or attached.

As shown in FIGS. 2 and 3, the valve mechanism 2 includes an input port 21 and an output port 22 opening in the valve body 11 and communicating with each other via a communicating portion 23. A valve seat 24 is formed around an opening of the input port 21 formed in an inner wall of the communicating portion 23. A diaphragm valve 25 has an outer peripheral edge firmly held between the adapter 15 and the valve body 11 via a diaphragm holder 16 to prevent a fluid flowing through the communicating portion 23 from leaking to a side of the adapter 15. In the diaphragm holder 16, a stem 17 is slidably held to contact with the diaphragm valve 25.

The pilot mechanism 3 holds the manual mechanism 4 in a rotatable manner. The manual mechanism 4 is switched its position by rotation to a "first position" in which a communication passage 46c is connected to an exhaust port 38 formed in the housing 18 to inhibit a valve opening/closing movement of the pilot mechanism 3 as shown in FIG. 3 and a "second position" in which the communication passage 46e is connected to an operation port 34 formed in the housing 18 to enable the valve opening/closing movement of the pilot mechanism 3 as shown in FIGS. 6 and 8. The manual mechanism 4 is positioned in the "first position" to surely close the combined valve 1, so that the manual mechanism 4 functions as a safety device for the pilot valve.

<Configuration of Pilot Mechanism>

As shown in FIGS. 2 and 3, the pilot mechanism 3 is coupled with the valve body 11 by the adapter 15. The pilot mechanism 3 is configured to supply or discharge operation air to or from piston chambers 29 and 30 through the operation port 34 to thereby move pistons 27 and 28 upward and downward in accordance with a balance between the pressure of the operation air acting on each lower surface of the pistons 27 and 28 and the elastic force of restoring springs 36, thereby bringing the diaphragm valve 25 into or out of contact with the valve seat 24.

In the pilot mechanism 3, both opening ends of the tube 14 are squeezed to fix the base 12 and the cap 13 to configure a cylinder. The housing 18 is threadedly mounted on the cap 13. The housing 18 is formed with the exhaust port 38 and the operation port 34 in which the joint 35 is mounted. A space defined by the base 12, the cap 13, and the tube 14 is partitioned into the piston chambers 29 and 30 by a partition member 31. The piston 27 is slidably loaded in the piston chamber 29 and the piston 28 is slidably loaded in the piston chamber 30.

The piston 28 has a connecting rod portion 28e whose upper end passes through the partition member 31 via an O ring 32a to protrude in the piston chamber 29 and fit in a connecting recess 27e of the piston 27 so that a main passage 28a of the piston 28 is communicated with a central passage 27a of the piston 27. The pistons 27 and 28 are continuously urged in a direction toward the valve seat 24 by an urging force of the restoring springs 36. The piston 28 protrudes downward in the diaphragm holder 16 in a manner that a lower end of a piston rod 28d passes through the base 12 via an O ring 32b so that the diaphragm valve 25 comes to contact with the valve seat 24 via the stem 17. The piston 28 has branch passages 28b and 28c extending perpendicular to the main passage 28a to be communicated with the piston chambers 29 and 30.

The piston 27 protrudes upward in the housing 18 in a manner that an upper end of a manual rod portion 27c passes through the cap 13 via a manual screw 37. The manual screw 37 threadedly engages with the cap 13 to bring a lower surface of the manual screw 37 in contact with a step portion 27d of the piston 27 to adjust an upward moving distance of the piston 27.

The housing 18 holds a center rod 46 formed with the communication passage 46c in a rotatable manner. The housing 18 is formed with a holding hole 18a extending along an axial direction to rotatably hold the center rod 46, the hole 18a being communicated with the operation port 34 via a passage 33. The housing 18 is further formed with a storage opening part 18b below the hole 18a along the same axis in the figure, the storage opening part 18b having a larger diameter than the hole 18a. The storage opening part 18b is provided at a portion lower than an opening portion where the operation port 34 opens in an inner wall of the hole 18a. Therefore, the housing 18 has a thicker thickness in the radial direction above the storage opening part 18b, so that the operation port 34 is provided as a cavity enough to mount the joint 35 therein.

The center rod 46 includes a flange 46e radially protruding outward from an outer peripheral surface of the rod 46. The rod 46 is inserted in the holding hole 18a so that the flange 46e contacts with an inner wall of the storage opening part 18b. The flange 46e is stacked on a partition member 52 and a fixing member 51 is attached to the housing 18. Thus, the center rod 46 is rotatably held in position in the housing 18. The partition member 52 is of annular shape in which a lower end of the center rod 46 is inserted. The partition member 52 is sealed with respect to the housing 18 by an O ring 53 (one example of a first sealing member) mounted on an outer peripheral surface of the partition member 52 and further sealed with respect to the center rod 46 by an O ring 54 (another example of the first sealing member) mounted on an inner peripheral surface of the partition member 52. The center rod 46 is sealed with respect to the housing 18 by an O ring 48 (another example of the first sealing member) above the operation port 34. The exhaust port 38 is formed in the housing 18 to communicate with the storage opening part 18b and an O ring 39 (one example of a second sealing member) is attached so as to surround an open end portion of the exhaust port 38 opening in the storage opening part 18b. Consequently, a clearance S1 (one example of a connecting passage) is formed between the housing 18, the center rod 46, and the partition member 52, the clearance S1 being connected to the operation port 34 while the clearance S1 is sealingly separated from the exhaust port 38 by the O rings 39, 48, 53, and 54.

The center rod 46 has an insertion hole 46a extending along an axis and a rod inserting portion 46b coaxially formed under a lower open end of the insertion hole 46a, the rod inserting portion 46b having a wider diameter than the insertion hole 46a. In the insertion hole 46a, an indicator rod 42 is inserted via an O ring 45. In the rod inserting portion 46b, the manual rod portion 27c of the piston 27 is slidably inserted via an O ring 55. Thereby, a clearance S2 hermetically closed by the O rings 45 and 55 is formed between the center rod 46, the manual rod portion 27c, and the indicator rod 42. The center rod 46 is formed with the communication passage 46c for communicating an upper surface of the flange 46e with an inner wall defining the clearance S2 (an inner wall of the rod inserting portion 46b) so that the clearance S2 can be connected to the clearance S1 or the exhaust port 38.

The piston 27 is integrally connected to the indicator rod 42 by inserting a connecting pin 44 in a pin hole 27b through both the manual rod portion 27e and the indicator rod 42. The clearance S2 is communicated with the central passage 27a of the piston 27 via a clearance S3 formed between an inner peripheral surface of the central passage 27a formed in the manual rod portion 27c and an outer surface of the indicator rod 42.

A flow passage configuration of the pilot mechanism 3 is now summarized. As shown in FIGS. 6 to 9, the operation port 34 is communicated with the piston chambers 29 and 30 via the clearance S1, the communication passage 46c, the clearances S2 and S3, the central passage 27a, the main passage 28a, and the branch passages 28b and 28c, thus an air supply passage is configured. Further, as shown in FIGS. 2 and 3, in the pilot mechanism 3, the exhaust port 38 is communicated with the piston chambers 29 and 30 via the communication passage 46c, the clearances S2 and S3, the central passage 27a, the main passage 28a, and the branch passages 28b and 28c, thus an air exhaust passage is configured. The supply passage and the exhaust passage are switched by rotating the center rod 46 of the manual mechanism 4 in FIGS. 1 and 5, thereby changing the location of the communication passage 46c as shown in FIGS. 2, 3, and 6 to 9.

<Configuration of Manual Mechanism>

The manual mechanism 4 shown in FIGS. 2 and 3 is configured in a manner that the sub handle 41 is fixed by a locking screw 58 shown in FIG. 3 to an upper end of the center rod 46 protruding upward from the housing 18 and the handle 40 is fixed to the sub handle 41 by a hexagonal socket bolt 47 so that the center rod 46 and the handle 40 are integrally rotated. On a lower end face of the center rod 46, there is provided a pair of drive transmission parts 46d protruding downward to be symmetric with respect to the rod inserting portion 46b. The drive transmission parts 46d are inserted in a drive transmission receiving portion 37a of oval shape formed on an upper face of the manual screw 37 to transmit the rotation of the handle 40 to the manual screw 37 through the center rod 46. The drive transmission part 46d is fitted with the drive transmission receiving portion 37a with a backlash to give play or allowance of the rotation of the manual mechanism 4 for preventing an operating error. The manual screw 37 is integrally rotated with the handle 40 and moved upward and downward in the figure by a screw feeding of a screw portion formed between the manual screw 37 and the cap 13, thereby setting an upward moving position of the pistons 27 and 28.

The indicator rod 42 is inserted from the center rod 46 to the sub handle 41 so that an upper end of the indicator rod 42 is placed in a bush 49 formed in an upper end of the sub handle 41. The bush 49 is mounted in an adjusted position in the sub handle 41 so that an upper end face of the bush 49 becomes flush with the upper end face of the indicator rod 42 during the valve-opening. The indicator rod 42 is moved upward and downward integral with the piston 27 connected to the rod 46 by the connecting pin 44. During the valve-closing of the pilot valve, the upper end face of the rod 42 is retracted in the bush 49 as shown in FIGS. 6 and 7. During the valve-opening of the pilot valve, on the other hand, the upper end face of the rod 42 appears at the upper end face of the bush 49.

The manual mechanism 4 is, as shown in FIG. 3, configured to restrict a rotation amount of the handle 40 by a locking pin 50 vertically mounted on an upper surface of the housing 18. As shown in FIG. 4, the sub handle 41 has a cutout 41a to be engaged with the locking pin 50. The cutout 41a is to prevent excessive rotation of the handle 40 by engagement with the locking pin 50 and includes an excessive rotation prevention end face 41b for preventing excessive pressure on the valve seat 24 and a second-position restricting end face 41c for positioning the manual mechanism 4 in the "second position" by the engagement with the locking pin 50. The sub handle 41 is fixed to the handle 40 and the center rod 46 so as to place the cutout 41a in a position corresponding to the lock mechanism 5.

<Lock Mechanism>

As shown in FIGS. 1 and 2, the housing 18 includes a key hole 18d in which a shackle or a cable of a padlock is inserted, the key hole 18d being formed in a thick portion of the housing 18 corresponding to the holding hole 18a. A slide groove 18c is formed on the key hole 18d. A lock plate 8 (one example of a locking member) is guided by guide pins 6 inserted in a slide groove 8a and held in the housing 18 so as to be slidable in upward and downward directions inside the slide groove 8a. The lock plate 8 is received in the slide groove 18c to slide without protruding from a side surface of the housing 18. When the manual mechanism 4 is positioned in the "first position", i.e., in the valve-closing state, the handle 40 is not placed on the lock plate 8 while the cutout 41a of the sub handle 41 is placed on the lock plate 8, so that the lock mechanism 5 can slide the lock plate 8 upward. On the other hand, when the manual mechanism 4 is positioned in the "second position", i.e., in the valve-opening state, the handle 40 and the sub handle 41 are placed on the lock plate 8, so that the lock mechanism 5 is unable to slide the lock plate 8 upward.

As shown in FIGS. 1 and 5, an upper end face of the housing 18 is provided with a display 9 for showing a state whether the pilot valve is enabled to operate by the rotation of the handle 40, i.e., indicating the valve closing/opening state switched by the manual valve. When the manual mechanism 4 is in the valve-closing state, a label "Disabled" appears on the display 9 as shown in FIG. 1 to inform that the pilot valve is disabled to operate (the manual valve is in the valve-closing state). Further, when the manual mechanism 4 is in the valve-opening state, a label "Enabled" appears on the display 9 as shown in FIG. 5 to inform that the pilot valve is enabled to operate (the manual valve is in the valve-opening state).

<Explanation for Operation when the Manual Valve is in the Valve-Closing State>

An operation when the manual valve is in the valve-closing state is now explained referring to FIGS. 1, 2, and 3.

As shown in FIGS. 1 to 3, when the handle 40 is rotated to switch the manual mechanism 4 to the "first position," the handle 40, the sub handle 41, the center rod 46, and the manual screw 37 are rotated interlocked with each other, causing the manual screw 37 to move downward. A lower end face of the manual screw 37 abuts on the step portion 27d of the piston 27, so that the diaphragm valve 25 is pressed against the valve seat 24 by the manual screw 37 through the pistons 27 and 28 and the stem 17.

As above, in the case that the manual valve is in the valve-closing state of supplying no operation air to the operation port 34, the pistons 27 and 28 are urged downward by the restoring springs 36 and the manual mechanism 4, and accordingly the diaphragm valve 25 is brought into contact with the valve seat 24 via the stem 17. Therefore, the combined valve 1 is unable to supply fluid from the input port 21 to the output port 22.

As shown in FIG. 3, when the manual mechanism 4 is switched to the "first position", the communication passage 46c of the center rod 46 is placed directly underneath an opening portion (open end portion) of the exhaust port 38 opening in the storage opening part 18b so that the communication passage 46c is communicated with the exhaust port 38. Connecting portions of the exhaust port 38 and the communication passage 46c are sealingly separated from the clearance S1 by the O ring 39. Accordingly, the piston chambers 29 and 30 are connected to the exhaust port 38 through the branch passages 28b and 28c, the main passage 28a, the central passage 27a, the clearances S3 and S2, and the communication passage 46c but not connected to the clearance S1. Therefore, even when the operation air is supplied from the operation port 34 to the clearance S1, the operation air is not supplied to the piston chambers 29 and 30, so that the valve-closing state is maintained.

Incidentally, an operator might continue to force the handle 40 to rotate without noticing that the diaphragm valve 25 is already in contact with the valve seat 24 and the handle 40 is hard to be rotated. In this case, the excessive rotation prevention end face 41b abuts on the locking pin 50 to block the rotation of the handle 40, thus the valve seat 24 being prevented from being crushed. Further, in such case, the communication passage 46c is merely slightly displaced from the opening portion of the exhaust port 38 within a sealed area sealed by the O ring 39. Thus, the communication passage 46c is only communicated with the exhaust port 38 but not communicated with the clearance S1.

When the manual mechanism 4 is switched to the "first position" as shown in FIG. 1, an upper side of the lock plate 8 is left open. In this state, the lock plate 8 is slid upward to expose the key hole 18d, and the shackle or the cable of the padlock is attached to the key hole 18d. Accordingly, the lock plate 8 raised by the shackle or the cable of the padlock is held in that raised position. Thereby, the second-position restricting end face 41c of the sub handle 41 is hooked on the lock plate 8, so that the manual mechanism 4 inhibits the rotation of the handle 40 in the valve-opening direction. As a result, the combined valve 1 is surely locked in the valve-closing state and can prevent an operating error of opening the valve.

In addition, as shown in FIG. 1, when the manual mechanism 4 is positioned in the "first position," the label "Enabled" of the display 9 is covered and hidden by the handle 40 and the label "Disabled" is exposed. Accordingly, an operator can confirm that the manual valve is in the valve-closing state and the pilot valve is disabled to operate.

<Operation to Open the Manual Valve and Close the Pilot Valve>

An operation to bring the manual valve in the valve-opening state and the pilot valve in the valve-closing state is now explained referring to FIGS. 5, 6, and 7.

As shown in FIGS. 5 and 6, when the manual mechanism 4 is switched to the "second position" by rotating the handle 40 so as to make the second-position restricting end face 41c of the sub handle 41 abut on the locking pin 50, the handle 40, the sub handle 41, the center rod 46, and the manual screw 37 are rotated together in interlocking relation to move the manual screw 37 upward. Thereby, a predetermined clearance is formed between the lower end face of the manual screw 37 and the step portion 27d of the piston 27, so that a pressing force of the manual mechanism 4 to press the diaphragm valve 25 against the valve seat 24 through the pistons 27 and 28 and the stem 17 is released.

When the manual mechanism 4 is switched to the "second position," the communication passage 46c of the center rod 46 is displaced from the exhaust port 38 and connected to the clearance S1. Accordingly, the piston chambers 29 and 30 are connected to the operation port 34 through the branch passages 28b and 28c, the main passage 28a, the central passage 27a, the clearances S3 and S2, the communication passage 46c, and the clearance S1, but not connected to the exhaust port 38. In such case that the operation air is not supplied to the operation port 34, the pistons 27 and 28 are pressed downward by an urging force of the restoring springs 36, thus pushing the diaphragm valve 25 through the stem 17 into contact with the valve seat 24. Therefore, the combined valve 1 is in the valve-closing state and does not supply the fluid from the input port 21 to the output port 22.

As shown in FIG. 5, when the manual mechanism 4 is positioned in the "second position," the label "Disabled" of the display 9 is covered and hidden by the handle 40 and the label "Enabled" is exposed. Therefore, an operator can confirm that the manual valve is in the valve-opening state and the pilot valve is in an operation enabled state.

Moreover, the indicator rod 42 is drawn downward by the piston 27 through the connecting pin 44 and the upper end face of the rod 42 is retracted in the bush 49. Accordingly, the operator can confirm that the pilot valve is not opened by seeing that the rod 42 is not appearing in the top of the bush 49.

When the manual mechanism 4 is positioned in the "second position", the handle 40 and the sub handle 41 are placed above the lock plate 8. Accordingly, it is not possible to raise the lock plate 8 and to attach the padlock to the key hole 18d while the manual mechanism 4 is maintained in the valve-opening state. Therefore, the combined valve 1 is not locked while the manual valve is kept in the valve-opening state.

<Operation to Open the Manual Valve and Open the Pilot Valve>

An operation to bring the manual valve in the valve-opening state and the pilot valve in the valve-opening state is now explained referring to FIGS. 8 and 9.

The operation of the manual mechanism 4 is same as above and therefore the explanation thereof is omitted.

When the operation air is supplied to the operation port 34 in the pilot mechanism 3, the operation air is allowed to flow in the piston chambers 29 and 30 through the clearance S1, the communication passage 46c, the clearances S2 and S3, the central passage 27a, the main passage 28a, and the branch passages 28b and 28c to pressurize the lower end faces of the pistons 27 and 28. The pistons 27 and 28 are moved upward by a balance between the elastic force of the restoring springs 36 and a pressure applied to the lower surface of the pistons 27 and 28 to separate the piston rod 28d from the stem 17. The diaphragm valve 25 is separated from the valve seat 24 by its own spring force and brings the input port 21 to communicate with the output port 22 via the communicating portion 23. Therefore, the combined valve 1 is able to supply a fluid from the input port 21 to the output port 22. A fully open position of the diaphragm valve 25 is determined when the stem 17 moved up by the diaphragm valve 25 comes into contact with the piston rod 28d.

<Operational Effects>

As explained above, the flange 46e of the manual mechanism 4 is formed with the communication passage 46c, achieving the manual mechanism 4 with a reduced width. The housing 18 in the pilot mechanism 3 has the storage opening part 18b for housing the flange 46e. The storage opening part 18b has a larger diameter than the holding hole 18a for holding the manual mechanism 4. Further, the exhaust port 38 opens in the upper inner wall of the storage opening part 18b. Thereby, the housing 18 has a thick thickness in the radial direction in a portion corresponding to the holding hole 18a which is provided closer to the manual mechanism 4 than the storage opening part 18b. Thus, the operation port 34 is formed in the thick portion of the housing 18 corresponding to the holding hole 18a to internally hold the joint 35 so that the joint 35 does not protrude outside the housing 18. The O rings 48, 53, and 54 form the clearance S1 between the housing 18 and the manual mechanism 4 to provide communication between the operation port 34 and the communication passage 46c. The O ring 39 is provided to sealingly separate the opening portion of the exhaust port 38 opening in the upper inner wall of the storage opening part 18b from the clearance S1. As a result, when the manual mechanism 4 is switched to the "first position", the communication passage 46c is communicated with the exhaust port 38 while the passage 46c is sealingly separated from the clearance S1 by the O ring 39 so as not to communicate with the clearance S1. Thereby, the pilot valve is unable to adjust pneumatic pressure of the pilot mechanism 3 and the valve is closed. On the other hand, when the manual mechanism 4 is switched to the "second position," the communication passage 46c is communicated with the operation port 34 through the clearance S1 while the passage 46c is sealingly separated from the clearance S1 by the O ring 39 so as not to communicate with the exhaust port 38 through the clearance S1. Consequently, the pilot valve is able to adjust the pneumatic pressure of the pilot mechanism 3 and the valve opening/closing operation of the valve mechanism 2 can be freely conducted. Therefore, the above-mentioned combined valve 1 can internally mount the joint 35 in the housing 18 without protrusion and hence achieve size reduction.

In the above combined valve 1, the O ring 39 is placed on the upper inner wall of the storage opening part 18b along an outer periphery of the opening portion of the exhaust port 38 opening in the upper inner wall of the storage opening part 18b to sealingly separate the exhaust port 38 from the clearance S1. Thus, the structure for sealingly separating the exhaust port 38 from the clearance S1 can be formed easily and compact.

In the above combined valve 1, the manual mechanism 4 is inserted in the holding hole 18a in a manner that the flange 46e abuts on the upper inner wall of the storage opening part 18b and the partition member 52 is attached to the housing 18 by the fixing member 51 so as to hold the flange 46e against the upper inner wall of the storage opening part 18b. The manual mechanism 4 has the end portion inserted in the partition member 52, the end portion protruding downward toward the valve mechanism 2. The O ring 53 seals between the partition member 52 and the housing 18 and the O ring 54 seals between the partition member 52 and the manual mechanism 4. Therefore, an operation fluid supplied to the operation port 34 passes through the clearance S1 and then flows in between the upper inner wall of the storage opening part 18b and the upper end face of the flange 46e and between the upper surface of the partition member 52 and the lower end face of the flange 46e. Thereby, the pressure acting on the upper end face of the flange 46e is balanced or canceled out by the pressure acting on the lower end face of the flange 46e. Therefore, according to the combined valve 1, the flange 46e is not firmly pressed by the partition member 52 even if the operation fluid is supplied to the operation port 34 and the manual mechanism 4 is easily switched between the "first position" and the "second position."

In the above combined valve 1, when the manual mechanism 4 is placed in the "first position" in which the communication passage 46c is communicated with the exhaust port 38 to close the pilot valve, the lock plate 8 is moved upward to protrude in order to block the rotation of the manual mechanism 4. The lock plate 8 is placed in the housing 18 without protruding laterally from the housing 18. Therefore, the combined valve 1 can include the lock mechanism 5 within a projected area of the valve 1 itself.

In the above combined valve 1, the indicator rod 42 coupled to the piston 27 is movably inserted in the manual mechanism 4 and the bush 49 is attached to the manual mechanism 4 so that the upper surface of the bush 49 is adjusted to a position corresponding to the upper end face of the indicator rod 42 in the valve opening state of the pilot valve. Therefore, during the valve opening/closing operation of the pilot valve, a moving amount of the upper end face of the indicator rod 42 from the upper surface of the bush 49 does not vary from product to product. Accordingly, the valve opening/closing operation of the pilot valve can be reliably detected, or recognized.

Additionally, in the combined valve 1 of the present embodiment, the lock mechanism 5 is configured such that the key hole 18d in which a shackle or a cable of a padlock is to be inserted is formed in the housing 18, so that the key hole 18d can have high strength. Therefore, the key hole 18d is unlikely to be broken and the lock mechanism 5 can maintain its locked state even if the padlock receives external impacts.

Further in the combined valve 1, the indicator rod 42 integrally coupled with the piston 27 is configured to mechanically detect the valve opening/closing operation of the pilot valve. Therefore, the combined valve 1 achieves high detection accuracy compared to another configuration to detect the valve opening/closing operation of the pilot valve by the presence or absence of the operation air to be supplied to the operation port 34.

Second Embodiment

Figure 10:
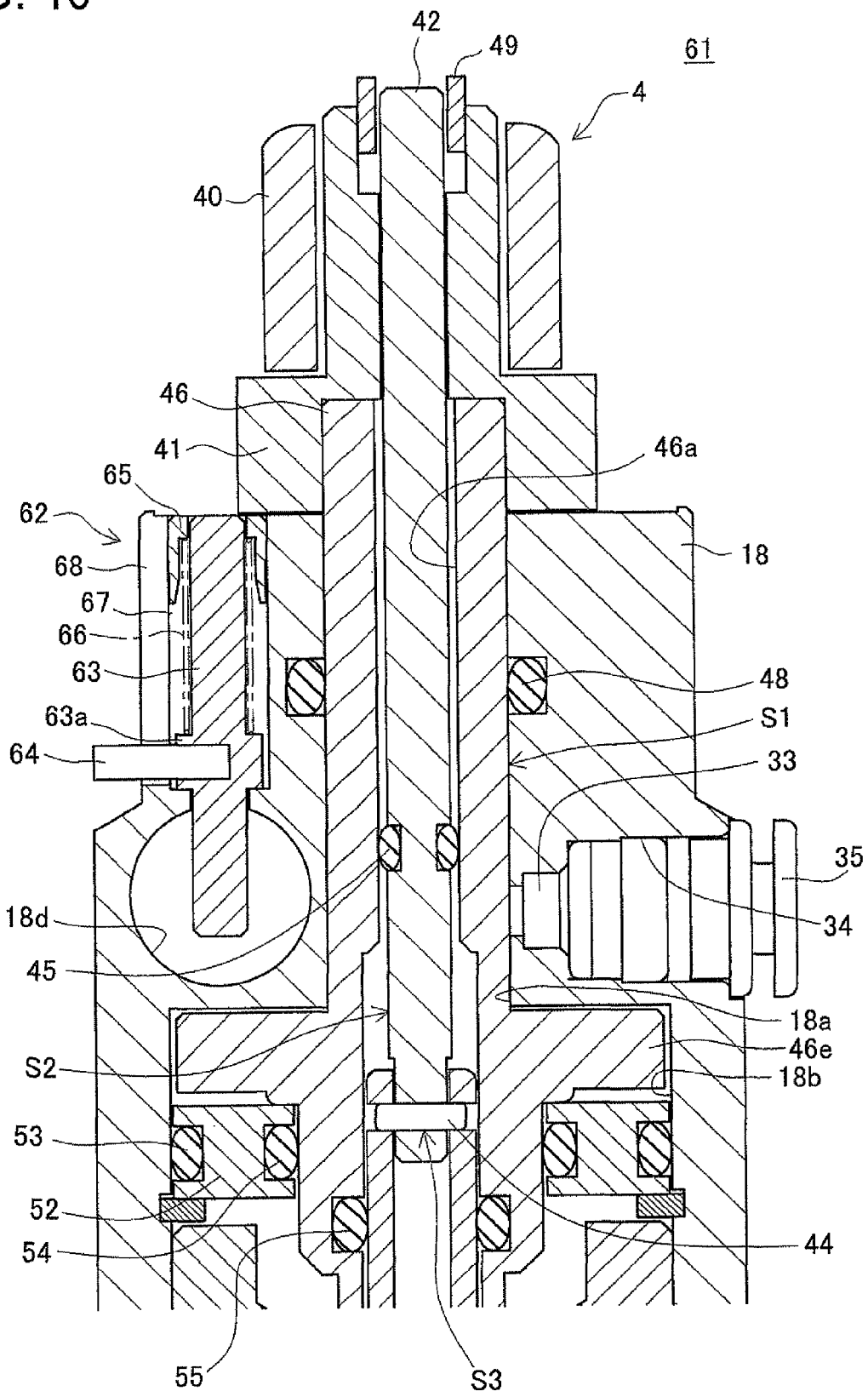
FIG. 10 is an enlarged sectional view of a lock mechanism and its surrounding parts of a combined valve in an unlocked state in a second embodiment of the invention.
Figure 11:
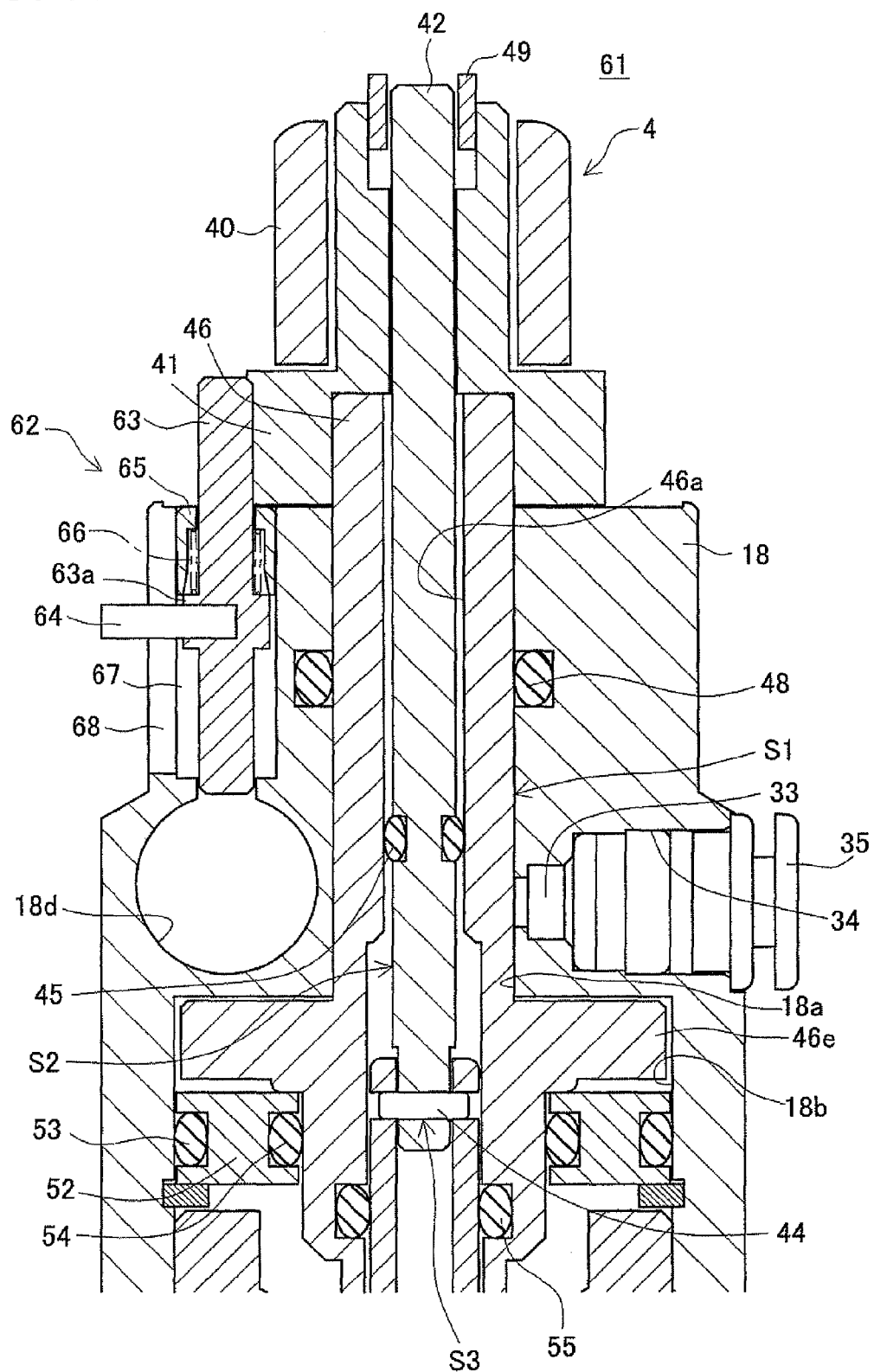
FIG. 11 is an enlarged sectional view of a lock mechanism and its surrounding parts of a combined valve in a locked state.
Figure 12:
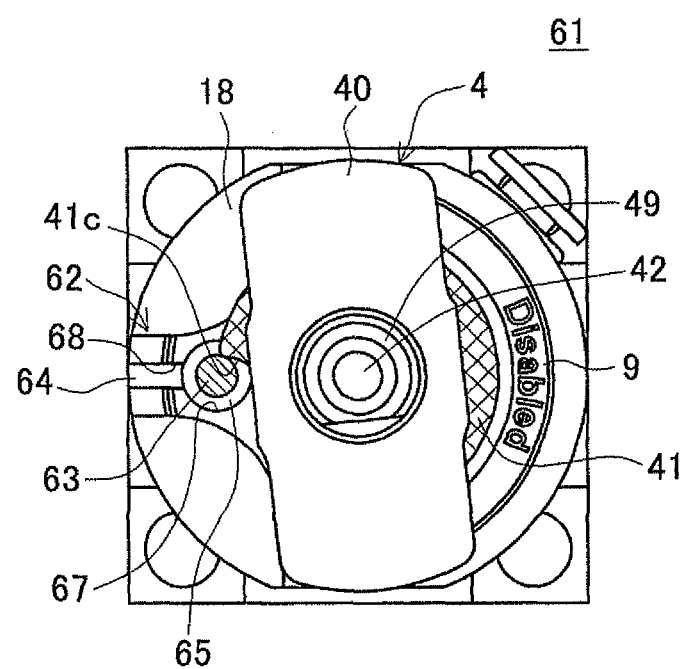
FIG. 12 is a top view of the combined valve shown in FIG. 11.
Figure 13:
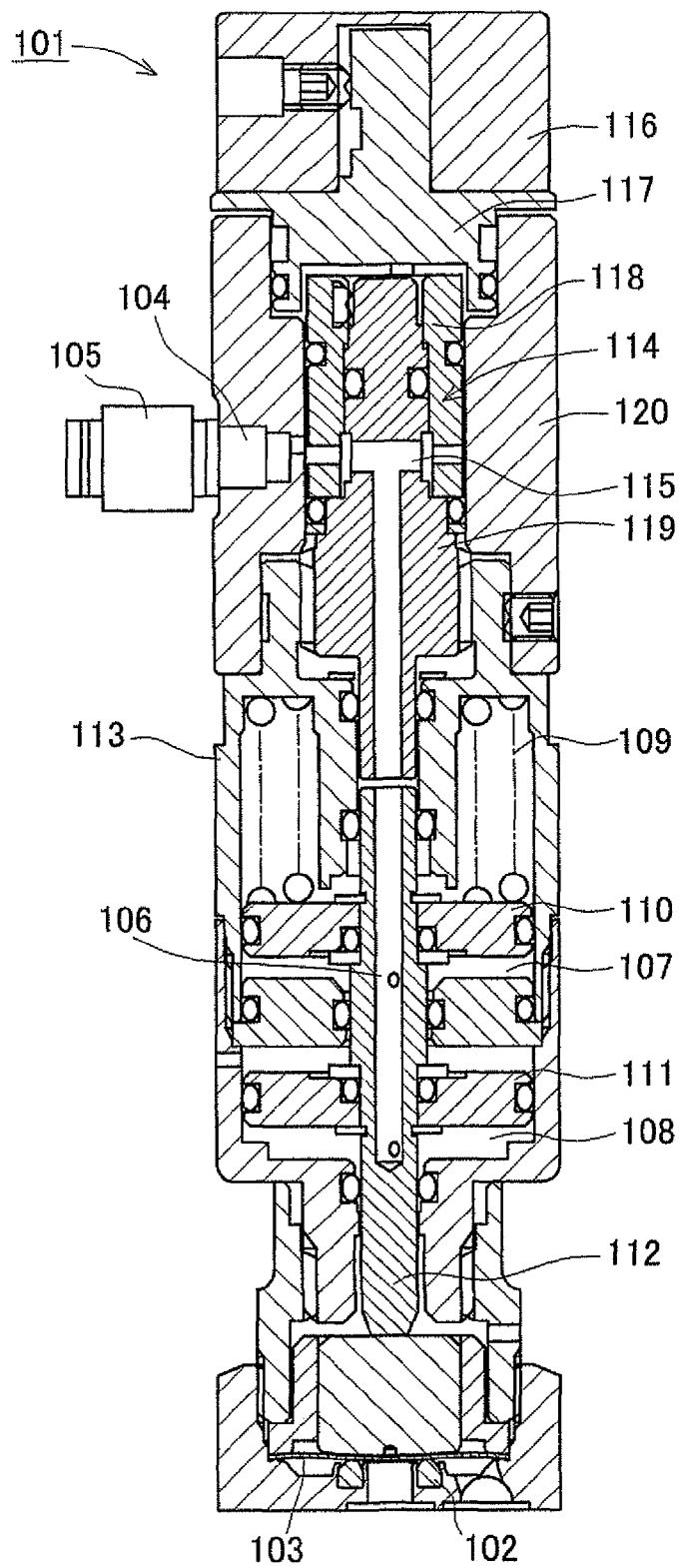
FIG. 13 is a sectional view of a conventional combined valve.

An explanation for a second embodiment of the invention is now given. FIG. 10 is an enlarged sectional view of a lock mechanism 62 and its surrounding parts of a combined valve 61 in the second embodiment, showing an unlocked state. FIG. 11 is an enlarged sectional view of the lock mechanism and its surrounding parts of the combined valve 61 in a locked state. FIG. 12 is a top view of FIG. 11. In FIG. 12, a lock pin 63 and the sub handle 41 are illustrated with hatching for clarifying their positional relation.

The combined valve 61 shown in FIGS. 10 to 12 has the same configuration with the combined valve 1 in the first embodiment except a structure of the lock mechanism 62. The lock mechanism 62 includes a pin hole 67 for holding the lock pin 63, the hole 67 being made from the upper end face of the housing 18. The housing 18 is formed with a slide groove 68 for allowing the pin hole 67 to communicate with outside of the housing 18 along an axial direction. An operation member 64 fixed to the lock pin 63 protrudes outward of the housing 18 through the slide groove 68 for guiding the lock pin 63 along the slide groove 68 in a vertical direction in the figure. A bush 65 is press-fitted in an opening of the pin hole 67. A coil spring 66 (one example of an urging member) is provided between the bush 65 and a spring holder 63a of the lock pin 63 in a contracted manner to continuously apply an urging force to the lock pin 63 so as to push the lock pin 63 into the pin hole 67.

In the combined valve 61, as shown in FIG. 10, when the operation member 64 is not operated, the lock pin 63 is stored in the pin hole 67 by the urging force of the coil spring 66. In this state, the lock pin 63 does not inhibit the rotation of the handle 40 and the manual mechanism 4 is enabled to operate between the "first position" and the "second position." On the other hand, when the operation member 64 is moved toward the bush 65 (upward in the figure) along the slide groove 68 while compressing the coil spring 66, the lock pin 63 is moved together with the operation member 64 to leave the key hole 18d open as shown in FIG. 11. When a shackle or a cable of a padlock is attached to the key hole 18d in such a state, the lock pin 63 is held in a lifted position by the shackle or the cable to be kept protruding from the bush 65. As a result, the second-position restricting end face 41c of the sub handle 41 abuts on the lock pin 63, and the rotation of the handle 40 is inhibited, so that the manual mechanism 4 is locked in the "first position."

Accordingly, in the combined valve 61, the lock pin 63 does not protrude to inhibit the rotation of the manual mechanism 4 unless an operator operates the operation member 64 and attaches the padlock to the key hole 18d. Therefore, when the combined valve 61 is mounted on a device with the manual mechanism 4 facing down, the operator is able to easily switch the manual mechanism 4 between the "first position" and the "second position" by operating the manual mechanism 4 by one hand until the padlock is attached. Therefore, according to the combined valve 61, the manual mechanism 4 can be locked in accordance with the operator's intention without regarding a mounting location and hence the lock mechanism 62 is easy to operate.

Further in the above combined valve 61, the lock pin 63 (locking member) is urged by the coil spring 66 (urging member) and housed in the housing 18. In order to block the rotation of the manual mechanism 4, the lock pin 63 is moved to protrude out of the housing 18 against the urging force of the coil spring 66. Therefore, according to the combined valve 61, the manual mechanism 4 can be locked in accordance with an operator's intention without regarding a mounting location and hence the lock mechanism 62 is easy to operate.

The invention is not limited to the above embodiments and various modifications may be applied.

For instance, in the above embodiments, the pilot mechanism 3 includes two pistons. Alternately, the pilot mechanism 3 may be provided with a single or three or more pistons.

For instance, in the above embodiments, the manual screw 37 is formed with the drive transmission receiving portion 37a of oval shape, but alternately, the drive transmission receiving portion 37a may be a circular hole. Further, the drive transmission receiving portion 37a of the manual screw 37 may be of protrusion-like shape and the drive transmission part of the center rod 46 of recess-like shape to transmit the rotation from the center rod 46 to the manual screw 37.

Furthermore, in the above embodiments, the pistons 27 and 28 are surface-contacted with each other to provide communication between the central passage 27a and the main passage 28a, thereby configuring an inner passage for supplying/discharging the operation air. Alternately, a plurality of pistons may be coupled together by cylindrical members for passage to form an inner passage. Moreover, it may be arranged such that a plurality of pistons is coupled with one another by axial insertion of a piston rod in the center of those pistons and an inner passage is formed in the piston rod.

In the above embodiments, the lock plate 8 or the lock pin 63 is maintained its lifted position by the shackle or the cable of the padlock attached to the key hole 18d. Alternately, the lock plate 8 or the lock pin 63 may be maintained its lifted position by another fixing member such as a pin.

In the above embodiments, the exhaust port 38 opens in the upper inner wall of the storage opening part 18b, but alternately, the exhaust port 38 may be formed to open in a side surface of the storage opening part 18b. Further, the operation port 34 opens in the holding hole 18a through the passage 33, but alternately, the operation port 34 may be formed to open in the upper inner wall or the side surface of the storage opening part 18b.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

1, 61 Combined valve
2 Valve mechanism
3 Pilot mechanism
4 Manual mechanism
5, 62 Lock mechanism
8 Lock plate (one example of a locking member)
18a Holding hole
18b Storage opening part
24 Valve seat
25 Diaphragm valve
27 Piston
27c Manual rod
36 Restoring spring (one example of an urging member)
18 Housing
34 Operation port
35 Joint
38 Exhaust port
39 O ring (one example of a second sealing member)
46b Rod inserting portion
46c Communication passage
48,53,54 O ring (one example of a first sealing member)
52 Partition member
63 Lock pin (one example of a locking member)
66 Coil spring (one example of an urging member)
S1 Clearance (one example of a connecting passage)

The invention claimed is:
1. A combined valve comprising:
a pilot valve; and
a manual valve,
the pilot valve including:
  a valve mechanism having a valve seat and a diaphragm valve to be brought into or out of contact with the valve seat; and
  a pilot mechanism arranged to cause the diaphragm valve placed in contact with the valve seat by an urging member to be separated from the valve seat by pneumatic pressure, the pilot mechanism including an exhaust port and an operation port,
the manual valve including a manual mechanism provided in a side of the pilot valve opposite from the valve mechanism, the manual mechanism including a communication passage and being rotatable to switch between a first position and a second position, the first position being set to close the pilot valve by making the exhaust port of the pilot mechanism communicate with the communication passage of the manual mechanism and the second position being set to allow a free opening/closing operation of the pilot valve by making the operation port of the pilot mechanism communicate with the communication passage,
wherein
the pilot mechanism has a housing provided with the exhaust port and the operation port,
the manual mechanism has a flange formed with the communication passage,
the housing includes:
  a holding hole formed in an axial direction for rotatably holding the manual mechanism; and
  a storage opening part having a wider diameter than the holding hole and housing the flange in position,
the operation port is located in a position corresponding to the holding hole and internally holds a joint, and the exhaust port opens in an inner wall of the storage opening part, and
the combined valve further includes:
  a first sealing member forming a connecting passage to connect the operation port and the communication passage between the housing and the manual mechanism;

a second sealing member sealingly separating an opening portion of the exhaust port opening in the inner wall of the storage opening part from the connecting passage; and a partition member of annular shape in which a part of the manual mechanism protruding from the flange toward the valve mechanism side is inserted, the partition member being mounted in the housing by holding the flange against the inner wall of the storage opening part, wherein the first sealing member includes:
a sealing component attached to an outer peripheral surface of the partition member to seal between the partition member and the housing; and
a sealing component attached to an inner peripheral surface of the partition member to seal between the partition member and the manual mechanism.

2. The combined valve according to claim 1, wherein the manual mechanism includes:
a piston;
an indicator coupled to the piston; and
a bush in which the indicator is movably inserted, the bush being placed in a position adjusted with respect to an upper end face of the indicator corresponding to an open state of the pilot valve.

3. The combined valve according to claim 1 including a lock mechanism provided with a locking member housed in the housing to be slidable along an axis of the housing,
the lock mechanism being configured to make the locking member to protrude out of the housing for blocking rotation of the manual mechanism when the manual mechanism is switched to the first position.

4. The combined valve according to claim 3, wherein the lock mechanism has an urging member for urging the locking member in a direction to house the locking member in the housing.

5. A combined valve comprising:
a pilot valve; and
a manual valve,
the pilot valve including:
a valve mechanism having a valve seat and a diaphragm valve to be brought into or out of contact with the valve seat; and
a pilot mechanism arranged to cause the diaphragm valve placed in contact with the valve seat by an urging member to be separated from the valve seat by pneumatic pressure, the pilot mechanism including an exhaust port and an operation port,
the manual valve including a manual mechanism provided in a side of the pilot valve opposite from the valve mechanism, the manual mechanism including a communication passage and being rotatable to switch between a first position and a second position, the first position being set to close the pilot valve by making the exhaust port of the pilot mechanism communicate with the communication passage of the manual mechanism and the second position being set to allow a free opening/closing operation of the pilot valve by making the operation port of the pilot mechanism communicate with the communication passage, wherein the pilot mechanism has a housing provided with the exhaust port and the operation port,
the manual mechanism has a flange formed with the communication passage,
the housing includes:
a holding hole formed in an axial direction for rotatably holding the manual mechanism; and
a storage opening part having a wider diameter than the holding hole and housing the flange in position,
the operation port is located in a position corresponding to the holding hole and internally holds a joint, and the exhaust port opens in an inner wall of the storage opening part, and
the combined valve further includes:
a first sealing member forming a connecting passage to connect the operation port and the communication passage between the housing and the manual mechanism;
a second sealing member sealingly separating an opening portion of the exhaust port opening in the inner wall of the storage opening part from the connecting passage, wherein the second sealing member is a seal component placed on the inner wall of the storage opening part along an outer periphery of the opening portion of the exhaust port; and
a partition member of annular shape in which a part of the manual mechanism protruding from the flange toward the valve mechanism side is inserted, the partition member being mounted in the housing by holding the flange against the inner wall of the storage opening part, wherein the first sealing member includes:
a sealing component attached to an outer peripheral surface of the partition member to seal between the partition member and the housing; and
a sealing component attached to an inner peripheral surface of the partition member to seal between the partition member and the manual mechanism.

6. The combined valve according to claim 5 including a lock mechanism provided with a locking member housed in the housing to be slidable along an axis of the housing,
the lock mechanism being configured to make the locking member to protrude out of the housing for blocking rotation of the manual mechanism when the manual mechanism is switched to the first position.

7. The combined valve according to claim 6, wherein the lock mechanism has an urging member for urging the locking member in a direction to house the locking member in the housing.

8. The combined valve according to claim 5, wherein the manual mechanism includes:
a piston;
an indicator coupled to the piston; and
a bush in which the indicator is movably inserted, the bush being placed in a position adjusted with respect to an upper end face of the indicator corresponding to an open state of the pilot valve.

* * * * *